United States Patent

Lewallyn et al.

[11] Patent Number: 4,989,766
[45] Date of Patent: Feb. 5, 1991

[54] CONVERTIBLE BACK PACK

[76] Inventors: Michael Lewallyn, P.O. Box 1361, Dalton, Ga. 30720; David McKin, P.O. Box 201, Fairmount, Ga. 30139

[21] Appl. No.: 395,067
[22] Filed: Aug. 17, 1989
[51] Int. Cl.⁵ .......................... A45F 4/02; A45C 15/00
[52] U.S. Cl. .................................... 224/155; 182/187; 224/151
[58] Field of Search ............... 224/151, 155, 153, 201; 182/187

[56] References Cited

U.S. PATENT DOCUMENTS

| | | | |
|---|---|---|---|
| 3,419,108 | 12/1968 | Mobbs | 182/187 |
| 3,460,649 | 8/1969 | Baker et al. | 182/187 |
| 3,871,482 | 3/1975 | Southard | 182/187 |
| 3,944,022 | 3/1976 | Ming | 224/153 |
| 4,362,307 | 12/1982 | Nakatani | 224/153 |
| 4,475,627 | 10/1984 | Eastridge | 182/187 |
| 4,819,763 | 4/1989 | Grote | 182/187 |
| 4,942,942 | 7/1990 | Bradley | 182/187 |

Primary Examiner—Henry J. Recla
Assistant Examiner—Keith Kupferschmid
Attorney, Agent, or Firm—Thomas & Kerr

[57] ABSTRACT

A back pack assembly which is convertible into a tree seat has a rigid, substantially planar member to which one end of each of a pair of elongated frame members is pivotally attached at either side of the planar member. Frame extension members are pivotally attached to the distal ends of the frame members, and a V-shaped blade member is adapted to be mounted to the distal ends of the extension members.

12 Claims, 2 Drawing Sheets

CONVERTIBLE BACK PACK

FIELD OF THE INVENTION

This invention relates to back packing devices and, more particularly, to a back packing device which is convertible into a tree stand.

BACKGROUND OF THE INVENTION

Sportsman, hunters, photographers and other wilderness and wild life enthusiasts, in order to hunt or observe indigenous wildlife, often must remain relatively motionless for extended periods of time while waiting for game to appear, especially where there is no ready means of concealment, and the relative immobility serves as the only form of concealment available. It can be extremely uncomfortable and tiring for the hunter or the like to stand still for an extended period, and equally uncomfortable to sit or lie on damp or cold ground. As a consequence, various types of tree seats have been employed by hunters to alleviate, at least to some extent, the discomfort and fatigue.

Tree seats for use by hunters generally comprise a platform which may support a cushion and a person seated thereon, and which is attached to a tree trunk to hold the seat in place in its operative position and configuration. The means by which the seat or platform is attached to the tree trunk generally consists of a length of chain, cable, or rope, which is attached to the platform and is wrapped around the tree trunk. Examples of each arrangements are shown in U.S. Pat. Nos. 2,855,980 of Konieczka, 3,368,725 of Martin, 3,513,940 of Ussery, 3,730,294 of Thurmond and 4,120,379 of Carter.

It is almost always the case that the desired location for the hunter to take station is sufficiently far from civilization or any roads to require considerable walking or hiking to get to it. As can be seen in most of the foregoing patents, the tree seats shown therein are somewhat cumbersome and awkward to carry, but if they are to be of any use, they must be carried by the hiker, i.e. hunter, to the desired location. Of the aforementioned patents, that of Thurmond suggests utilizing the tree seat structure itself as a back pack of sorts, while the Martin patent suggests the use of a back pack frame as a tree seat of sorts. Thus, with both the Martin and the Thurmond arrangements, the tree seat of Thurmond and the back pack of Martin perform a useful function while being transported to the desired site, and also after the desired site is reached, while most prior art tree seats must be transported to the desired site before they can perform any useful function.

Although both the Thurmond and Martin devices perform dual functions, the Thurmond device is barely adequate as a back pack, while the Martin device is barely adequate as a tree seat. In both devices, a chain is used to attach the tree seat to the tree, which, inasmuch as a chain of sufficient size and length is both heavy and cumbersome, adds materially to the weight that must be carried to the site. In addition, the mode of attachment of these devices to the tree does not allow for ready adjustment of the height of the seat above the ground.

In U.S. Pat. No. 4,369,858 of Babb there is shown a tree seat which does permit height adjustment, but which is otherwise cumbersome to transport, and which does not function as anything other than a tree seat, for example, as a back pack.

SUMMARY OF THE INVENTION

The invention, in an illustrative embodiment thereof, is a back pack which comprises a rigid, substantially planar member having first and second sides and a V-shaped notch in one end thereof. A slotted elongated side bar member extends along each side of the planar member and an elongated frame member having proximal and distal ends is pivotally attached at the proximal end thereof to each of the side bar members. Each of the elongated frame members has pivotally attached intermediate its ends a bracing member, the other or proximal end of which is slidably mounted in the slot of the corresponding side bar member. A load bearing assembly is pivotally attached to each of the frame members intermediate the ends thereof for bearing the back pack load. Carrying straps for fitting over the shoulders of the back packer are provided.

In accordance with the invention, the back pack is readily convertible into a tree seat. To this end, a frame extension member is hingedly connected to the distal end of each of the frame members. When converting the back pack to a tree seat, the hunter or the like unfolds the frame extension members and attaches, at the ends thereof, a V-shaped blade member which bears against the rear or back of the tree. The load bearing assembly is pivoted upwardly and back to form a seat located above the rigid planar members which forms the floor of the platform. The several pivot connections are provided with means, such as wing nuts, for making the tree seat structure rigid.

The structure of the back pack of the present invention is such that it functions as a full capacity back pack while being worn by a hiker, which is readily convertible into a sturdy tree seat. Such back pack is particular useful after a hunt to transport the meat or carcass of prey from the hunting site. Various other features and advantages of the invention will be more readily apparent from the following detailed description, read in conjunction with the accompanying drawings.

BRIEF DESCRIPTIVE OF THE DRAWINGS

DETAILED DESCRIPTION

Figure 1:
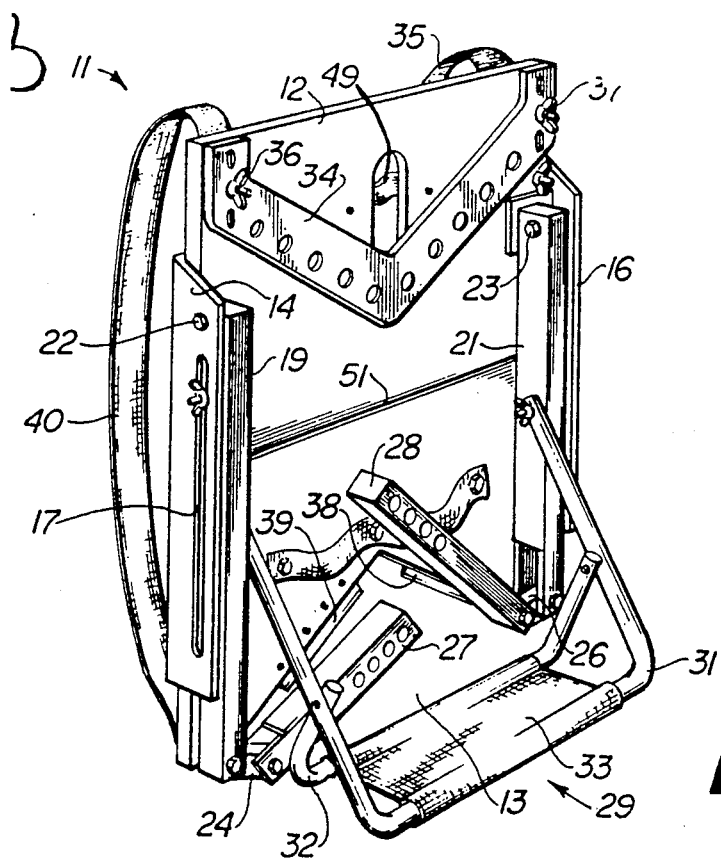
FIG. 1 is a perspective view of the back pack of the present invention in its back pack configuration.

The back pack 11 of the present invention, as shown in FIG. 1, comprises a rigid, substantially planar member 12 of plywood, plastic, or the like having, at one end thereof, a V-shaped notch 13. First and second side bar members 14, 16 of suitable material such as anodized aluminum, are mounted on each side portion of member 12 with bolts or other suitable means. Each of the side bar members 14, 16 is provided with a longitudinally extending slot 17, 18, only 17 being readily visible in FIG. 1. A pair of elongated frame members 19, 21 having proximal and distal ends are pivotally attached at their proximal end to the ends of the side bar members by suitable means such as pivot pins or bolts 22, 23, best seen in FIG. 2. Frame members 19, 21 are preferably U-channel anodized aluminum, or other suitable lightweight, strong material. Affixed to members 19 and 21 at the distal ends thereof by suitable hinge means 24, 26 are a pair of U-channel frame extension members 27 and 28 which also preferably are of anodized aluminum, and which, in the back pack configuration, are folded against frame members 19 and 21.

A load bearing assembly 29 comprises a first U-shaped frame member 31 pivotally attached at its ends to frame members 19 and 21 intermediate the ends thereof, and a second U-shaped frame member 32 having the ends of its legs pivotally attached to the legs of member 31 intermediate the ends thereof, as shown, by means of bolts and wing nuts. A load bearing member 33 extends between the members 31 and 32 and is swivelly mounted to the bights thereof, as shown.

Mounted in a storage position on member 12 is a V-shaped blade 34 having ears 36 and 37, which are drilled or slotted. Blade 34, which preferably is of aluminum, is drilled, as shown, to make it as light as possible without sacrificing strength. A pair of blades 38, 39 are mounted on either side of V-shaped notch 13 and extend into the notch, as shown. The functions of blades 34, 38, and 39 will be discussed more fully in connection with FIG. 2.

A pair of shoulder straps 35 and 40 are affixed to the bottom surface of members 12, and, if desired, suitable cushioning means, shown in dashed outline, may be provided.

Figure 2:
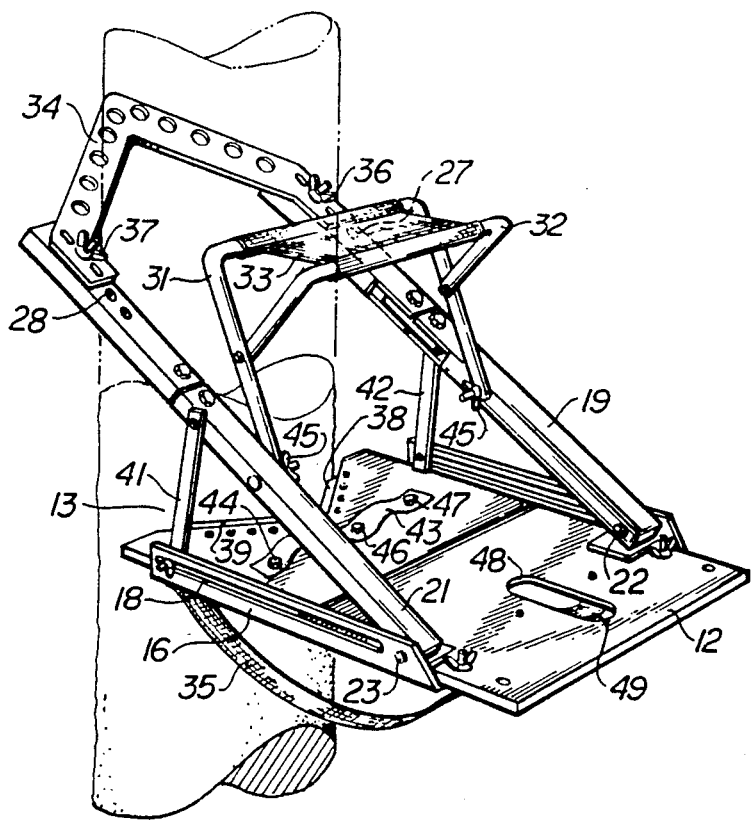
FIG. 2 is a perspective view of the back pack of the present invention in its tree seat configuration.

FIG. 2 depicts the tree seat configuration of the back pack 11, wherein a pair of bracing members 41 and 42, each of which is pivotally attached at one end to members 19 and 21 respectively, and pivotally and slidably mounted at the other end in slots 17 and 18 by means of bolts and wing nuts. When frame members 19 and 21 are unfolded and angled upward, as shown, the wing nuts on members 41 and 42 are tightened so that members 19 and 21 are firmly held in position. Members 27 and 28 are shown unfolded, and blade 34, at the back or rear of the tree is mounted thereto by means of ears 36 and 37 and suitable bolts. Members 27 and 28 have a plurality of mounting holes drilled therein, and these, in conjunction with the holes in ears 36 and 37 make the assembly adaptable to a wide range of tree trunk diameters. The edge of blade 34 that bears against the rear of the tree, and the edges of blades 38 and 39 that bear against the front of the tree are preferably sharp enough to give good puncture on the tree, but not so sharp as to present a hazard to the user.

The load bearing assembly 29 is rotated up and back toward the tree trunk, against which it may rest, and wing nuts 40 are tightened to hold the assembly, which now functions as a seat, in place.

A toe strap 43 is mounted on member 12 and affixed thereto at three places 44, 46 and 47. The purpose of the toe strap is to enable the operator to adjust the height above the ground of the tree seat without leaving the platform. This mode of height adjustment is well known in the art, and makes use of the fact that in the configuration shown in FIG. 2, the weight of a person sitting on seat 33 forces blades 34, 38 and 39 into the tree, thereby insuring a secure mounting. Height adjustment consists of the user facing the tree trunk with his toes in the loops of strap 43. By embracing the trunk, he relieves the pressure on blades 43, 38 and 39, thus making it possible to lift or lower the seat. When he releases the trunk, blades 34, 38 and 39 immediately dig into the trunk, thereby again securing the tree seat.

When the person using the tree seat is equipped with a rifle or shotgun, it can be tiring to hold it in the hands for extended periods. To alleviate this problem, platform 12 has a slot 48 cut therein to accommodate the butt of the firearm, and a web or strap 49 on the underside of member 12 and spanning the slot 48 supports the butt.

A piano type hinge 51 may be provided so that when the back pack is totally disassembled for storage or shipping, member 12 may be folded to make it even more compact.

Figure 3:
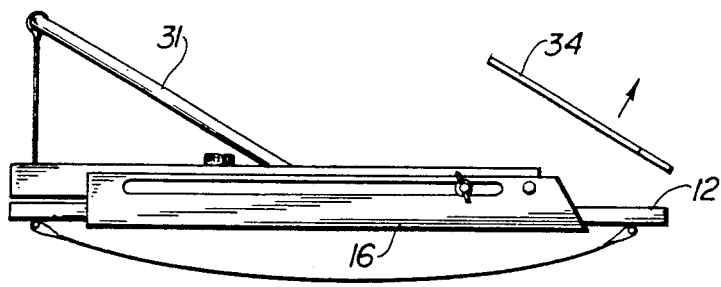
FIGS. 3, 4 and 5 depict the sequence of operations or converting the back pack to a tree seat.
Figure 4:
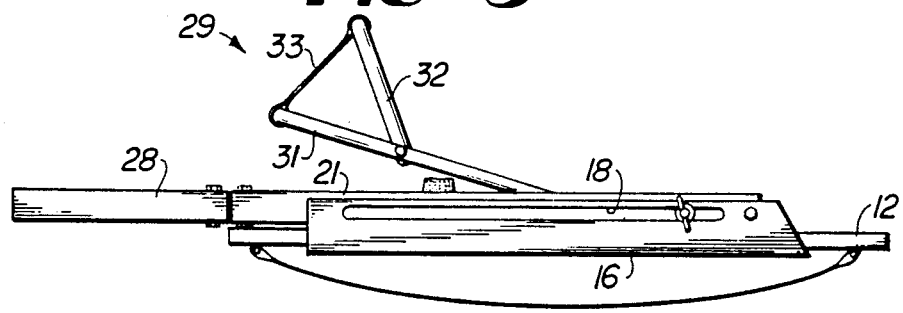
Figure 5:
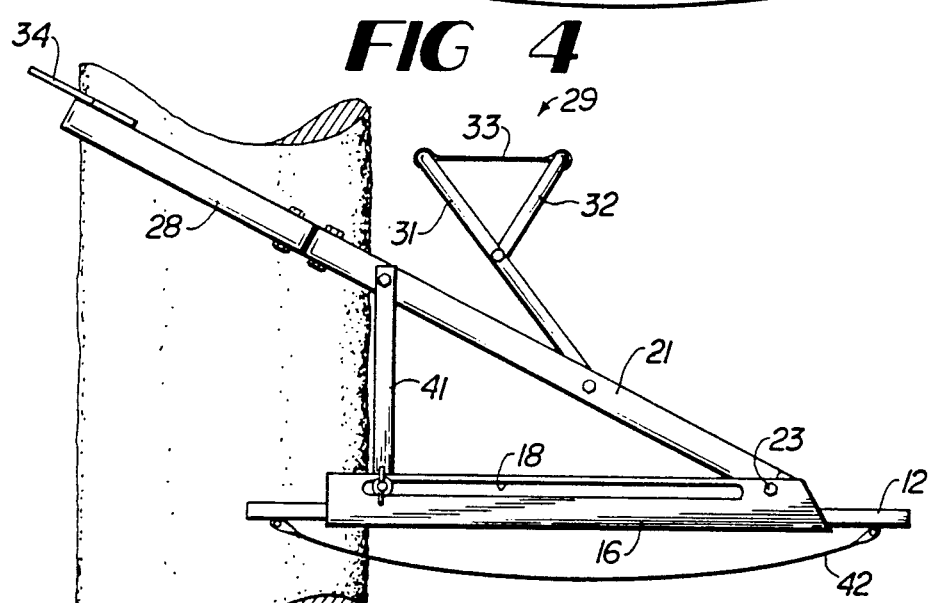

FIGS. 3, 4, and 5 depict three stages in the conversion of the back pack, in FIG. 3, to the tree seat in FIG. 5. In FIG. 3, blade 34 is removed, and all wing nuts are loosened. In FIG. 4, extensions 27 and 28 are unfolded to be coextensive with members 19 and 21 respectively and the support assembly 29 is raised. In FIG. 5, support assembly 29 may be swung back to rest against the tree trunk, or it may be positioned as shown, and all wing nuts are then tightened to produce a stable, rigid structure.

Figure 6:
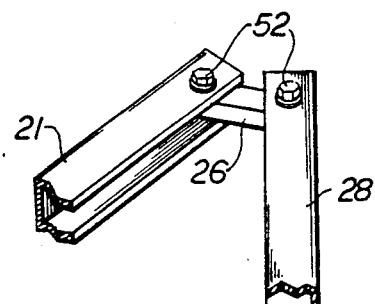
FIG. 6 is a perspective detail view of the hinge connection between a frame member and a frame extension members.
Figure 7:
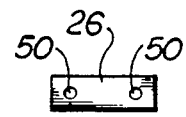
FIG. 7 is a detail of the hinge connection of FIG. 6.

FIGS. 6 and 7 depict the details of the hinge attachment connecting frame member 21 and extension member 28. It is to be understood that an identical hinge arrangement is provided for frame member 19 and extension 27. The hinge connection comprises a block 26 of suitable material, such as aluminum, dimensioned to fit within the U-shaped channels of members 21 and 28, and having holes 50,50 drilled at each end. Matching holes are drilled in members 21 and 28, and pivot pins, 52, 52 which may be bolts, are inserted through the several holes and fixed in place. Thus members 21 and 28 can both pivot relative to block 26. An important feature of such an arrangement is that when member 28 is swung around to be coextensive with member 21, block 51 rides in the channels of both members 21 and 28, extending across the junction therebetween, and materially reinforcing and strengthening the junction.

From the foregoing it can be seen that the back pack of the present invention is of relatively light weight and easily transported, while the tree seat into which the backpack converts is sturdy and reliable. The embodiment of the invention herein described is intended to be illustrative of the principles of the invention, and numerous changes or modifications may occur to workers in the art without departure from the spirit and scope of the invention.

We claim:

1. A back pack assembly comprising a rigid, substantially planar, member, first and second elongated side bars having first and second ends and outer sides and inner sides mounted to said planar member, each of said side bars having a slot extending along substantially the entire length thereof between said ends, first and second elongated side frame members, each of said frame members having a proximal end and a distal end and an outer side and an inner side, the proximal end of said first side frame member being pivotally attached to the inner side of said first side bar adjacent the first end thereof, and the proximal end of said second frame member being pivotally attached to the inner side of said second side bar adjacent the first end thereof, a load bearing assembly pivotally attached to the inner sides of said side frame members intermediate the ends thereof, first and second bracing members each having proximal and distal ends, said first bracing member having its distal end pivotally mounted to the outer side of said first side frame member intermediate the ends thereof and having its proximal end pivotally and slidably mounted in the slot of said first side bar, and said second bracing member having its distal end pivotally mounted to the outer side of said second side frame member intermediate the ends thereof and having its proximal end pivotally and slidably mounted in the slot of said second side bar, first and second frame extension means each having first and second ends, hinge means for hingedly mounting the first end of said first extension means to the distal end of said first side frame member and for hingedly mounting the first end of said second extension means to the distal end of said second side frame member, whereby the frame extension means are movable between an extended operable position where the backpack assembly is used as a seat, to a hinged inoperable position where the backpack assembly is carried as a backpack, a blade member removably mounted to said second ends of said frame extension means remote from said first ends to which the hinge means are mounted, when said frame extension means are in the extended position, and carrying means mounted on said planar member.

2. A back pack assembly as claimed in claim 1 wherein said substantially planar member has first and second side portions and a rear portion, said rear portion having a substantially V-shaped notch formed therein.

3. A back pack assembly as claimed in claim 2 and further including first and second blade members mounted on said planar member and extending into said V-shaped notch from either side thereof.

4. A back pack assembly as claimed in claim 1 wherein said hinge means comprises an elongated bar pivotally connected to each of said frame members at the distal end thereof and to each of said extension members at the first end thereof.

5. A back pack assembly as claimed in claim 4 wherein said first and second frame members and said first and second frame extension means are formed of U-shaped channel material, and said elongated bar is adapted to fit within the U-shaped channels of each of said frame members and each of said extension means.

6. A back pack assembly as claimed in claim 1 wherein said load bearing assembly comprises a first support member having first and second legs, one end of each of said legs being pivotally attached to one of said frame members intermediate the ends thereof, a second support member having third and fourth legs, one end of each of said third and fourth legs being pivotally attached to one of said first and second legs and load bearing means mounted between said first and second support members.

7. A back pack assembly as claimed in claim 6 wherein said first and second support members are of U-shaped configuration and said load bearing means is swivelly mounted to the bights of said support members.

8. A back pack assembly as claimed in claim 1 wherein the blade member is V-shaped and further including a V-shaped blade member adapted to be mounted to the said second ends of said frame extension means remote from the said one end to which said hinge means is mounted.

9. A back pack assembly as claimed in claim 8 wherein said blade member has first and second ears mounted to the ends thereof, each of said ears having a plurality of mounting holes therein.

10. A back pack assembly as claimed in claim 1 wherein said rigid substantially planar member has first and second sections connected by a hinge extending between said side bars.

11. A back pack assembly as claimed in claim 1 including means for preventing said proximal ends of said bracing members from sliding in said slots.

12. A back pack assembly as claimed in claim 1 wherein said proximal end of said first bracing members is mounted on the inner side of said first said bar and the proximal end of said second bracing member is mounted on the inner side of said second side bar.

* * * * *